(12) United States Patent
Barnard et al.

(10) Patent No.: US 9,635,981 B2
(45) Date of Patent: May 2, 2017

(54) FOOD PROCESSING MACHINE

(71) Applicant: Vita-Mix Corporation, Cleveland, OH (US)

(72) Inventors: John K. Barnard, Olmstead Falls, OH (US); Richard D. Boozer, Wakeman, OH (US); Eugene J. Kozlowski, Medina, OH (US); Fred H. Mehlman, Brunswick, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 14/312,747

(22) Filed: Jun. 24, 2014

(65) Prior Publication Data

US 2014/0307518 A1 Oct. 16, 2014

Related U.S. Application Data

(62) Division of application No. 12/221,158, filed on Jul. 30, 2008.

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0761* (2013.01)

(58) Field of Classification Search
CPC A47J 43/046; A47J 43/04; A47J 43/06; A47J 43/0761

USPC ......................................... 366/204, 205, 207
See application file for complete search history.

(56) References Cited

U.S. PATENT DOCUMENTS 3,175,594 A * 3/1965 Jepson et al. ................. 366/205
4,812,623 A * 3/1989 Haden et al. ................. 219/437
5,273,358 A * 12/1993 Byrne ...................... H02K 9/06
  310/51

(Continued)

FOREIGN PATENT DOCUMENTS

EP 0512172 B1 * 11/1995

*Primary Examiner* — Tony G Soohoo
*Assistant Examiner* — Anshu Bhatia
(74) *Attorney, Agent, or Firm* — Renner, Kenner, Greive, Bobak, Taylor & Weber (57) ABSTRACT

A food processing assembly (20) includes a base member (21), a container (22) and a cover (23). The base member (21) has a platform portion (26) adapted to carry the container (22) and a housing portion (25) for a motor. A wall (29) of the housing (25) has a plurality of air inlet slots (35) and a gutter (37) protects the slots (35) from receiving any liquid which might be on the base member (21). The container (22) has a sidewall (52) with an open top that has a peripheral rim (57). A cover (23) includes a tab assembly (73) that has a notch (70) to receive the rim (57). The vertical lifting of a handle portion (77) of the tab assembly (73) removes the cover (23) from the container (22). A spout (61) and a handle (60) are formed near the top of the container (22). A heat shield (62) includes a body portion (63) which is attached to the sidewall (52) at a location under the spout (61), and it also includes a flap (62). The body portion (63) protects the hand of the user when engaging the sidewall (52) of the container (22) and the flap (64) protects the hand of the user from drippings from the spout (61).

12 Claims, 9 Drawing Sheets

(56) References Cited

U.S. PATENT DOCUMENTS

| | | | | |
|---|---|---|---|---|
| D432,204 S | * | 10/2000 | Brady | D23/209 |
| 6,793,096 B1 | * | 9/2004 | Seok | 220/788 |
| 2006/0261066 A1 | * | 11/2006 | Boozer et al. | 220/254.7 |
| 2007/0131723 A1 | * | 6/2007 | Anderson | A47G 19/14 222/465.1 |
| 2007/0140048 A1 | * | 6/2007 | Ismail | 366/205 |
| 2007/0278122 A1 | * | 12/2007 | McCumber | B65D 81/3294 206/514 |
| 2008/0089170 A1 | * | 4/2008 | Larsen et al. | 366/205 |

* cited by examiner

FOOD PROCESSING MACHINE

CROSS-REFERENCE TO RELATED APPLICATION

This application is a division of U.S. patent application Ser. No. 12/221,158 filed on Jul. 30, 2008, which is incorporated herein by reference in its entirety.

TECHNICAL FIELD

This invention relates to a food processing machine of the type which utilizes a mixing blade to blend food products in a container. More particularly, this invention relates to the manner in which the cover of the container is attached to and detached from the container, and the manner in which hot food products can be safely dispensed from the container. In addition, this invention relates to the manner in which the motor which rotates the blade is protected from moisture.

BACKGROUND ART

Most food processing equipment that blends foods in a container by means of a rotating blade includes a cover for the container. Such covers must be securely attached to the container during the mixing of the foods, and yet, at the same time, be removable without requiring undo force. Some prior art covers are made of a flexible material and include a slot which receives a lip of the container thereby holding the cover on the container. In some of these covers, a tab extends from the cover and is lifted to release the cover from the container. However, after multiple flexures, this release system of the prior art tends to breakdown such that the tab becomes overflexed resulting in the inability of the cover to latch onto the container.

An additional problem arises when the equipment is being used to mix large volumes of hot liquids, such as soups or the like. Normally such liquids are dispensed from the container by lifting the container by its handle and pouring the liquid out through a spout. However, if the equipment includes a very large container, for example, of more than one gallon in volume, as might be used in institutions such as hospitals or the like, dispensing of the heavy hot liquid can be problematic. For example, such might require the use of two hands, one lifting the handle and the other gripping the container under the spout. But such not only exposes that hand to the temperature of the hot liquid in the container but also exposes that hand to the possibility of hot drippings from the spout.

Moreover, to blend these large volumes of liquids requires a large motor which rotates the mixing blade. These motors generate a great deal of heat and must be cooled usually by drawing cooling air into the motor housing and expelling that air through outlet ports. However, inasmuch as the processor is often being used in an environment with liquids close by, it is important to make certain that no liquids are drawn into the motor housing. For example, if the motor housing has just been cleaned, extreme care must be taken to assure that it is dry so that no liquids will be drawn into the motor housing.

The need exists, therefore, for food processing equipment which is not plagued with these problems of the prior art.

DISCLOSURE OF THE INVENTION

It is thus an object of one aspect of the present invention to provide food processing equipment with a container and a cover that can be securely attached to the container and yet be easily removed.

It is another object of that aspect of the present invention to provide the food processing equipment, as above, in which the cover is removed from the container by flexing a handle but which will not become overflexed after multiple uses.

It is an object of another aspect of the present invention to provide food processing equipment with a large container from which hot liquids can be readily dispensed without allowing the heat from the liquids to irritate or harm the user.

It is an object of an additional aspect of the present invention to provide food processing equipment which is powered by an air cooled motor in a housing and which prohibits liquid from entering the housing with the air.

These and other objects of the present invention, as well as the advantages thereof over existing prior art forms, which will become apparent from the description to follow, are accomplished by the improvements hereinafter described and claimed.

In general, a food processing assembly made in accordance with one aspect of the present invention includes a container having a base surface and at least one sidewall extending upwardly from the base surface and forming an open top. A spout is formed on the sidewall near the open top and a handle is formed on the sidewall generally opposed to the spout. A heat shield is attached to a portion of the sidewall generally at the location of the spout.

In accordance with another aspect of the invention, a food processing assembly includes a container having a peripheral rim near an upper open surface. A cover is provided to close the upper open surface, the cover having at least one tab assembly. The tab assembly includes a body portion having a notch to engage the rim and a handle portion extending upwardly from the body portion. Upon upward movement of the handle portion, the rim will come out of the notch to release the cover from the container.

Yet another aspect of the invention relates to a food processing assembly which includes a container and a base member adapted to carry the container. Air intake openings are formed in the base member and a gutter is provided to prevent liquid from being received by the openings.

These aspects of the invention thus include a food processing assembly including a container having a base surface and at least one sidewall extending upwardly from the base surface and forming an open top. A peripheral rim is formed on the container near the open top. A spout is formed on the sidewall near the open top and a handle is formed on the sidewall generally opposed to the spout. A heat shield is attached to a portion of the sidewall generally at the location of the spout. A cover is provided to close the upper open surface, the cover having at least one tab assembly. The tab assembly includes a body portion having a notch to engage the rim and a handle portion extending upwardly from the body portion. Upon upward movement of the handle portion, the rim will come out of the notch to release the cover from the container. A base member is adapted to carry the container and air intake openings are formed in the base member. A gutter is provided to prevent liquid from being received by the openings.

A preferred exemplary food processing device made according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
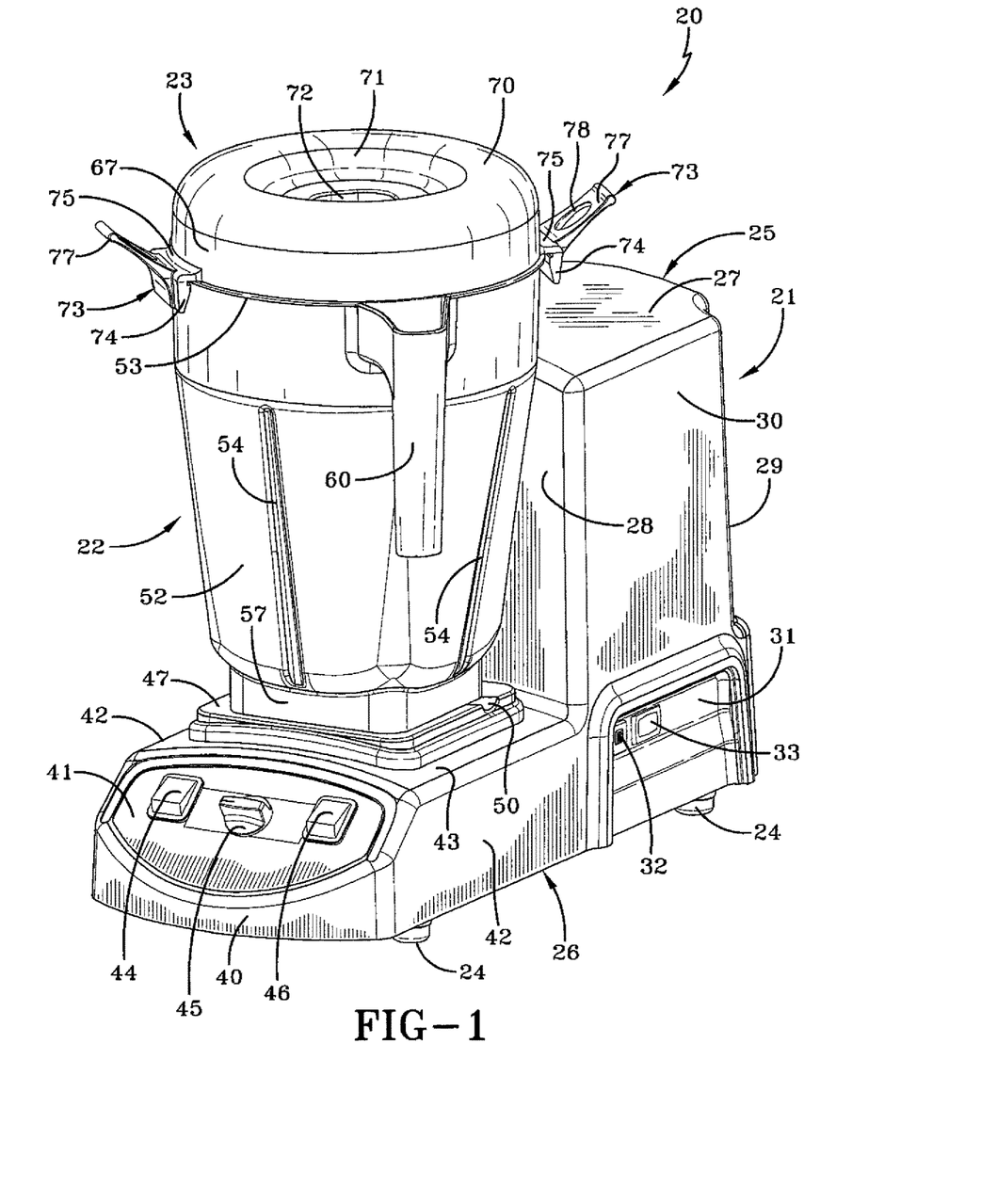
FIG. 1 is a perspective view of a food processing assembly including a base member housing a motor, a container, and a cover made in accordance with the present invention.

A food processing assembly is shown in FIG. 1 and is generally indicated by the numeral 20. Assembly 20 includes three basic component parts, a base member indicated generally by the numeral 21, a blender container indicated generally by the numeral 22, and a cover for the container 21 indicated generally by the numeral 23.

Base member 21 is provided with feet 24 and includes a motor housing portion generally indicated by the numeral 25 and a platform portion generally indicated by the numeral 26. Housing portion 25 includes a top wall 27, opposed front and rear walls, 28 and 29 respectively, and opposed side walls 30 which together with a bottom surface (not shown) house a motor. One of the side walls 30 is provided with a recess 31 which can receive any of several controls such as a circuit breaker 32, a master power switch 33 or the like. Because these controls are recessed, they are protected from accidental contact.

Figure 10:
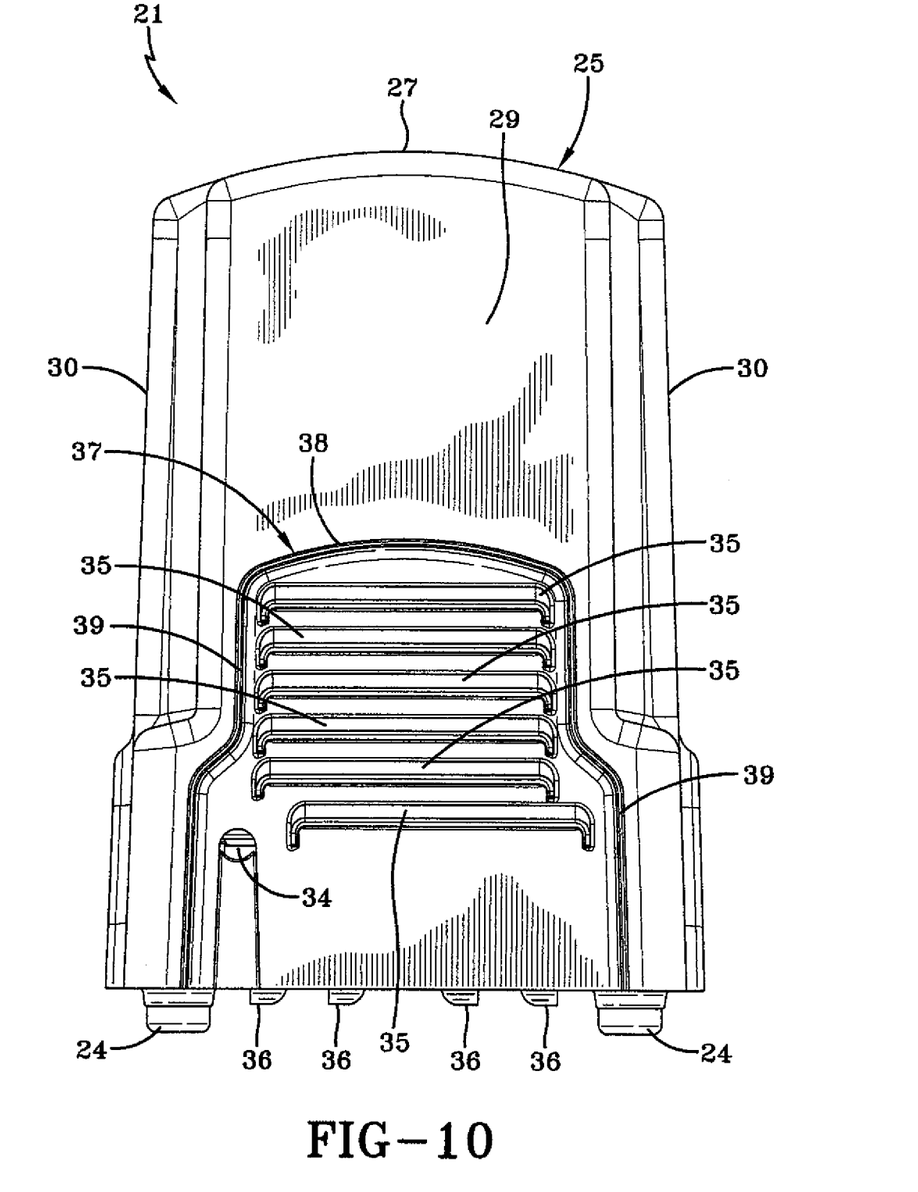
FIG. 10 is a rear elevational view of the base member.

As shown in FIG. 10, the rear wall 29 of housing portion 25 may be provided with an opening 34 for the passage of a power cord for the motor. Rear wall 29 is also provided with a plurality of air intake slots or louvers 35. A fan in housing portion 25 draws cooling air into housing portion 25 through louvers 35, and past the motor. The air is then expelled from housing portion 25 through slots 36 in the bottom surface of base member 21. A gutter, generally indicated by the numeral 37, is formed above and around louvers 35. Gutter 37 is designed to protect any liquid that might be on housing portion 25, and in particular that might be running down rear wall 29, from being received by the air intake louvers 35. Gutter 37 thus includes a top portion 38 positioned above louvers 35 to collect any such liquid, and opposed side portions 39 which allow the liquids to leave rear wall 29. As such, any liquids which might have otherwise been drawn into housing portion 25 through louvers 35, to the detriment of the motor contained therein, is drained away from the louvers 35 and the motor is thereby protected.

Platform portion 26 of base member 21 includes a front wall 40 having a control panel 41, opposed side walls 42, and a top surface 43 extending between front wall 40, side walls 42, and front wall 28 of housing portion 25. The back of platform portion 26 is open and communicates with the inside of housing portion 25. Control panel 41 may include any number of conventional controls such as an on/off switch 44, a motor speed control 45, and/or a motor pulsing button 46.

Figure 11:
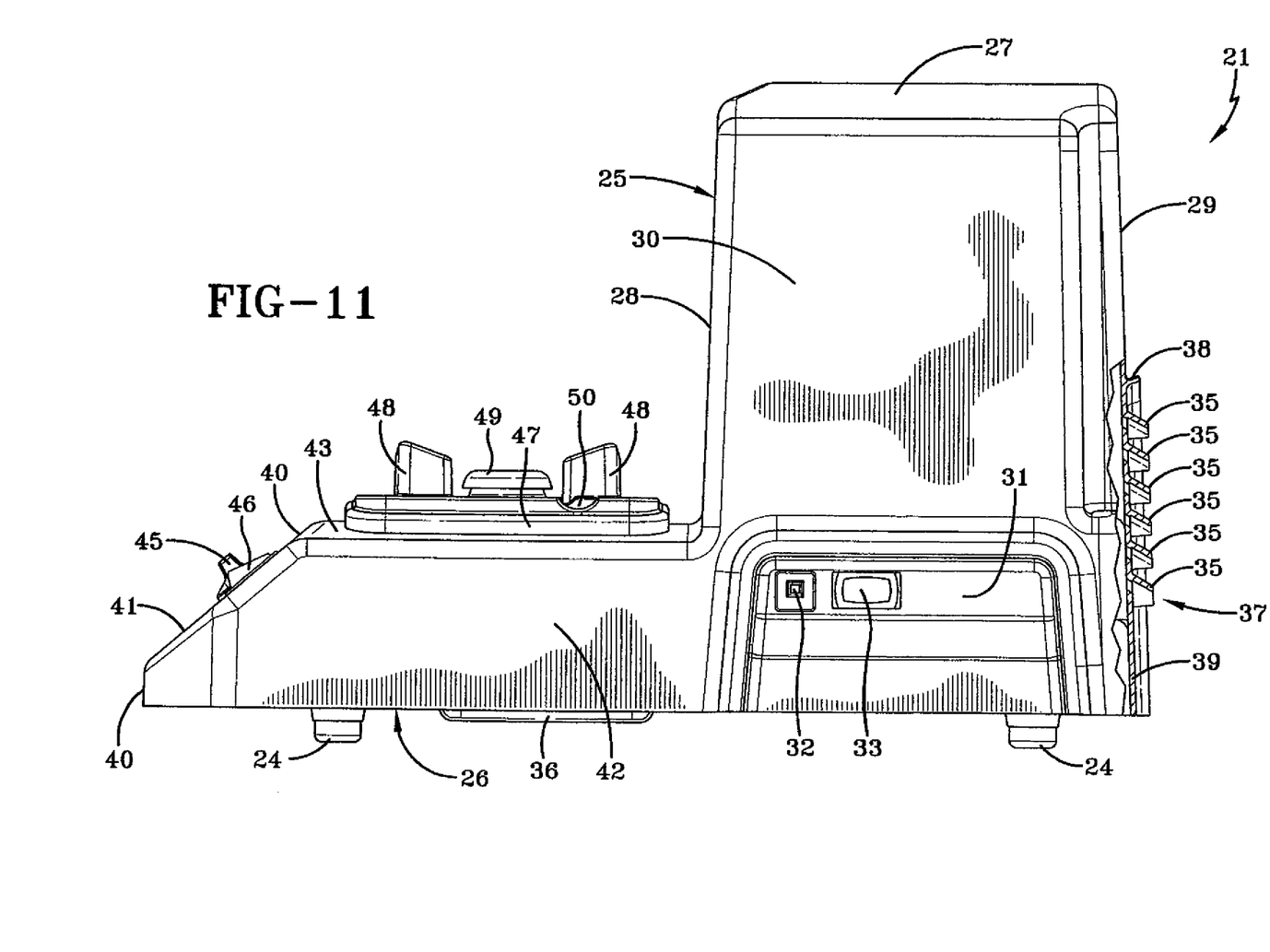
FIG. 11 is a partially sectioned side elevational view of the base member.

As best seen in FIG. 11, the top surface 43 of platform portion 26 is provided with a pedestal 47 which carries four locator pads 48 (two shown) to receive the corners of the bottom of container 22, and is provided with a coupler 49 to attach the motor to the container 22 as will be hereinafter described. Pedestal 47 is also provided with at least one drainage channel 50 to direct any present liquid away from coupler 49.

Blender container 22 may be made of a clear plastic material, such as a copolyester or polycarbonate material, and includes a bottom surface 51 and a sidewall or sidewalls 52 extending upwardly therefrom to form an open top. A rim 53 extends outwardly from the periphery of the open top at the top of the sidewalls 52. Sidewalls 52 are shown as being generally circular in configuration and thus, in essence, only one continuous sidewall is shown. However, the container 22 could take on any configuration, such as square and therefore having four sidewalls, without departing from the concepts of the present invention. If a generally circular sidewalk 52 is provided, as shown, it may be provided with a plurality of generally vertically extending ribs 54 which generally provide strength to the sidewall 52, enhance the mixing of foods, and also are aesthetically pleasing. The addition of strength to the sidewall 52 and the enhancement of mixing can be important particularly when large volume containers 22 are provided. For example, it is contemplated that food processing assembly 20 may have particular applicability to the commercial environment of a hospital or an assisted living establishment. As such, a container 21 of a capacity of a gallon and a half or more may be provided.

Figure 2:
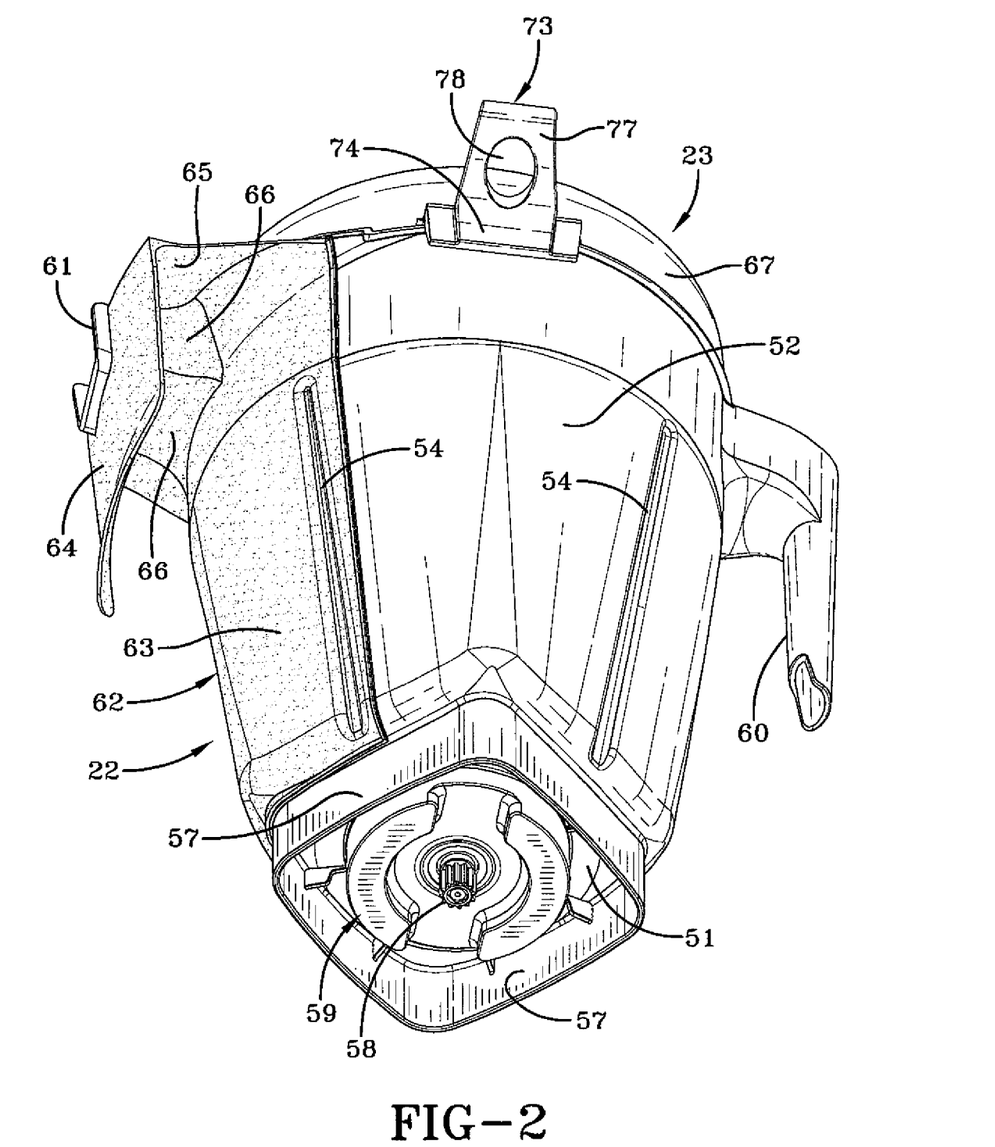
FIG. 2 is a bottom perspective view of the container and cover.
Figure 3:
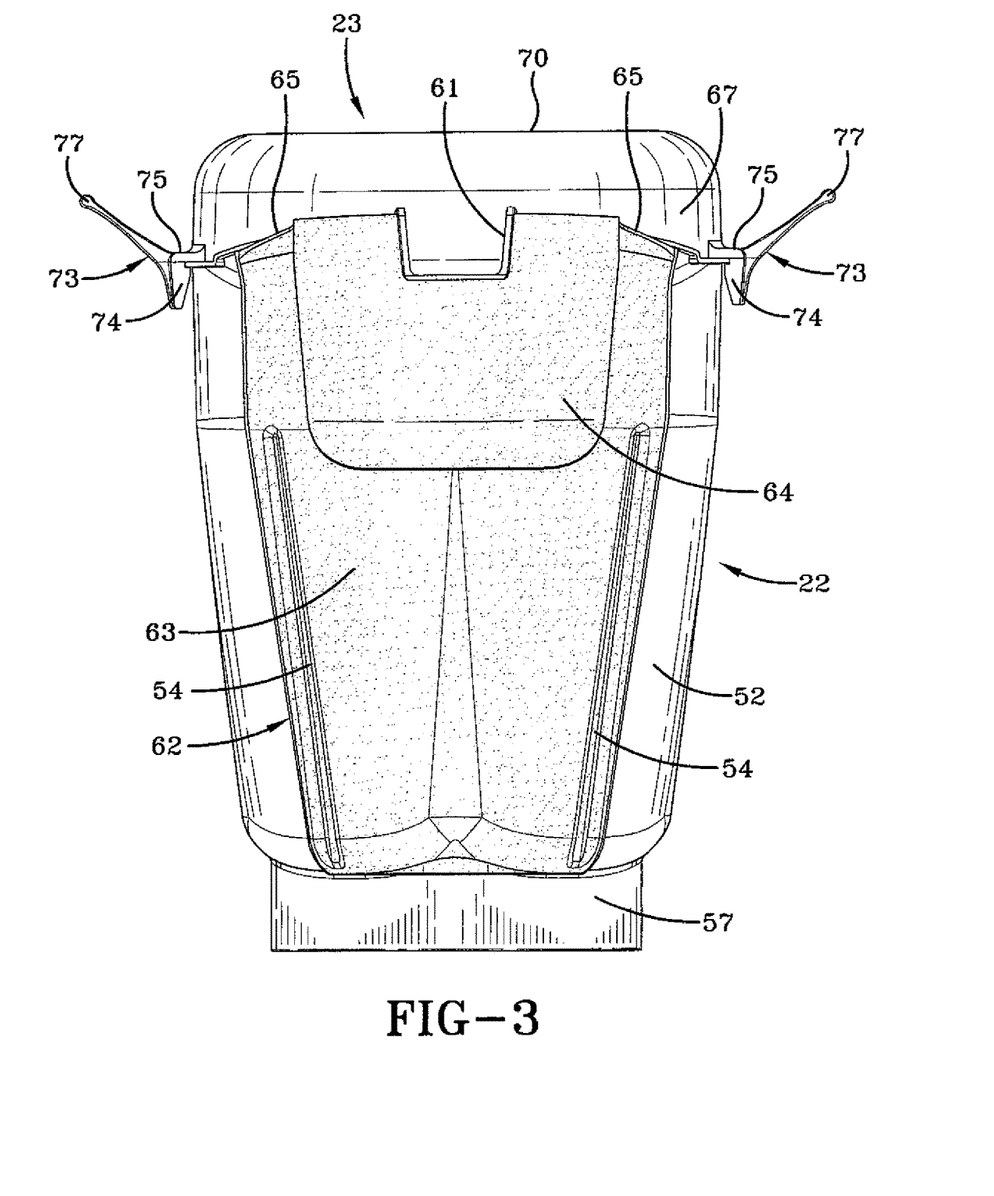
FIG. 3 is a front elevational view of the container and cover.
Figure 5:
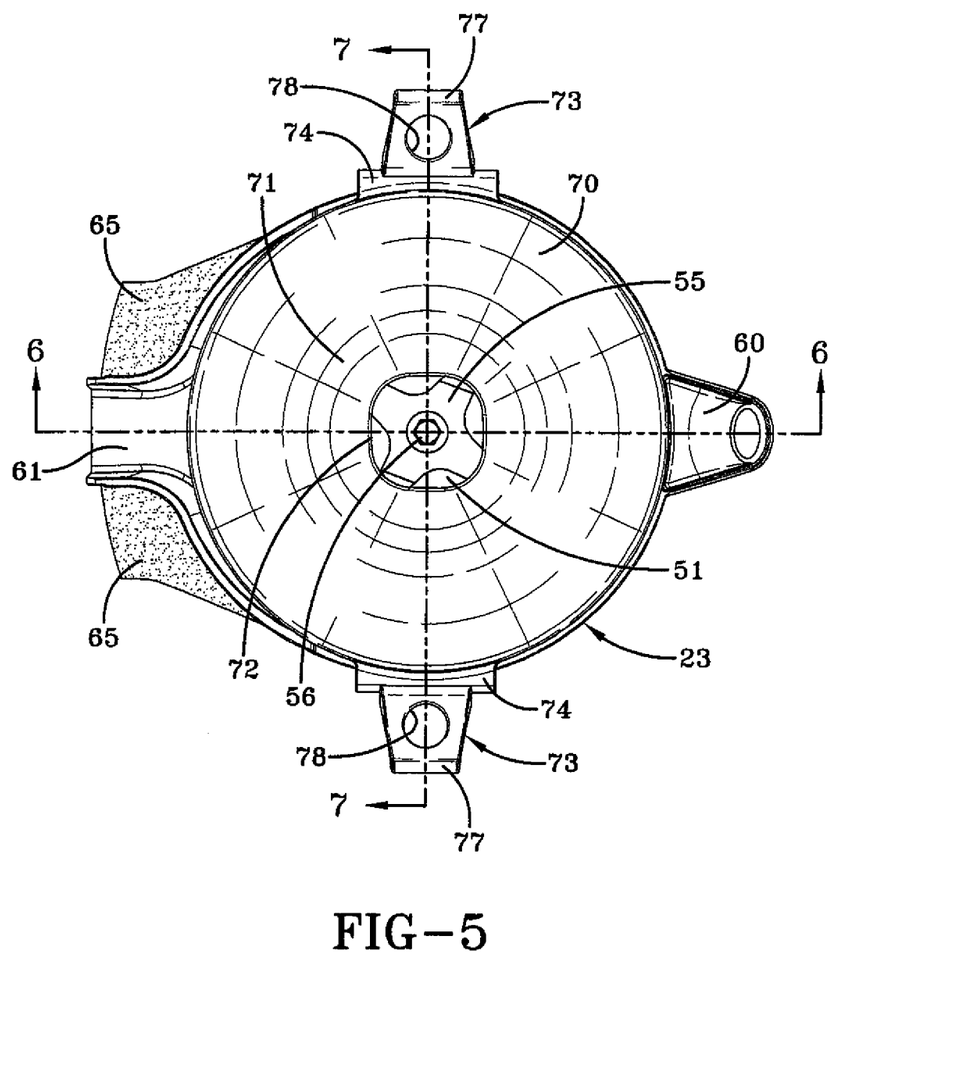
FIG. 5 is a top plan view of the container and cover.

A blender blade 55 (FIG. 5) is conventionally carried on a shaft 56 near the bottom surface 51 of container 22. A base skirt 52 extends downwardly from bottom surface 51 and is generally rectangular in nature so as to fit over locator pads 48 on base platform 26. As shown in FIG. 2, shaft 56 extends through bottom surface 51 and has a conventional splined end 58 which is adapted to be received by coupler 49. A number of structural ribs and the like, generally indicated by the numeral 59, are provided within skirt 57 and around splined shaft end 58. Once shaft 56 is so connected to coupler 49, activation in the motor will rotate blade 55 is a conventional fashion. If, as previously described, the container 22 is of a large volume, a large motor must be provided in housing portion 25 which is why the side walls 30 of housing portion 25 are shown as having a significant height. The motor in housing portion 25 can then rotate shaft 56, preferably through a belt drive extending from housing portion 25 into platform portion 26 through the open back thereof.

Container 22 is shown as having a handle 60 carried near the top of sidewall 52 and a pouring spout 61 is formed at the top of sidewall 52 at a location generally diametrically or otherwise opposed to handle 60. A heat shield, generally indicated by the numeral 62, made of an insulating, soft material such as a flexible thermoplastic elastomer, is formed on container sidewall 52 at the area of spout 61. Specifically, heat shield 62 includes a body portion 63 which is attached to a portion of container sidewall 52 at an area under spout 61 extending from spout 61 to the bottom of sidewall 52 terminating at skirt 57. Body portion also extends approximately one quarter of the circumference of sidewall 52. Heat shield 62 also includes a safety flap 64 spaced from body portion 63, and a generally horizontal top portion 65 interconnects flap 64 and body portion 63. Top portion 65 thus extends outwardly from near the top of body portion 63 at the sides of pouring spout 61. In addition, heat shield 62 may also be extended, as at 66, to cover the bottom and the outer sides of the spout 61.

Figure 4:
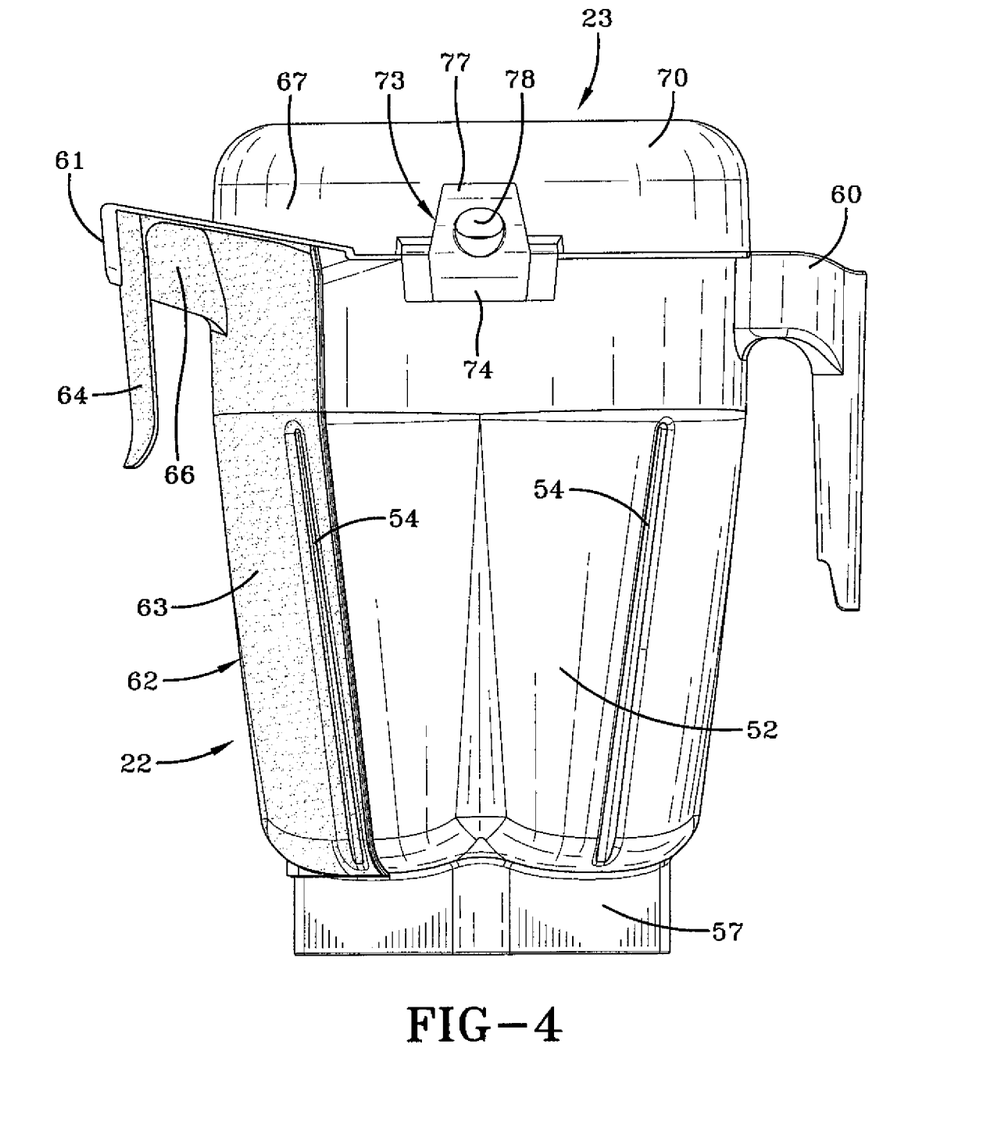
FIG. 4 is a side elevational view of the container and cover.

Because container 22 is intended to be quite large, as previously described, it may be difficult to pour liquid through the spout 61 by only holding the handle 60, particularly if container 22 is full of liquid. In this situation, the usual tactic of the user is to grasp the handle 60 with one hand and place the other hand on the sidewall 52 under the spout 61. However, if container 22 is holding a hot liquid, as may often be the case, in the prior art such a procedure could prove harmful or at least uncomfortable to the user's hand which could either be irritated or burned by contact with the sidewall or by drippings from the spout. However, the heat shield 62 of the present invention prevents such harm. As can be seen in FIGS. 2 and 4, for example, there is a space between heat shield body portion 63 and flap 64 within or under which the user may place his or her hand to assist in pouring of hot liquid through spout 61. As such, body portion 63 protects the hand against heat from the liquid within the container, and flap 64 protects the hand from hot drippings from spout 61.

Container cover 23 is formed of a resilient or elastomeric material such as most known thermoplastic elastomers (TPE's). Such TPE's include, for example, thermoplastic olofin rubbers, thermoplastic vulcanizates, and thermoplastic elastic block copolymers. These materials are particularly suited for cover 23 as they all inhibit the elastomer properties required for cover 23.

Figure 6:
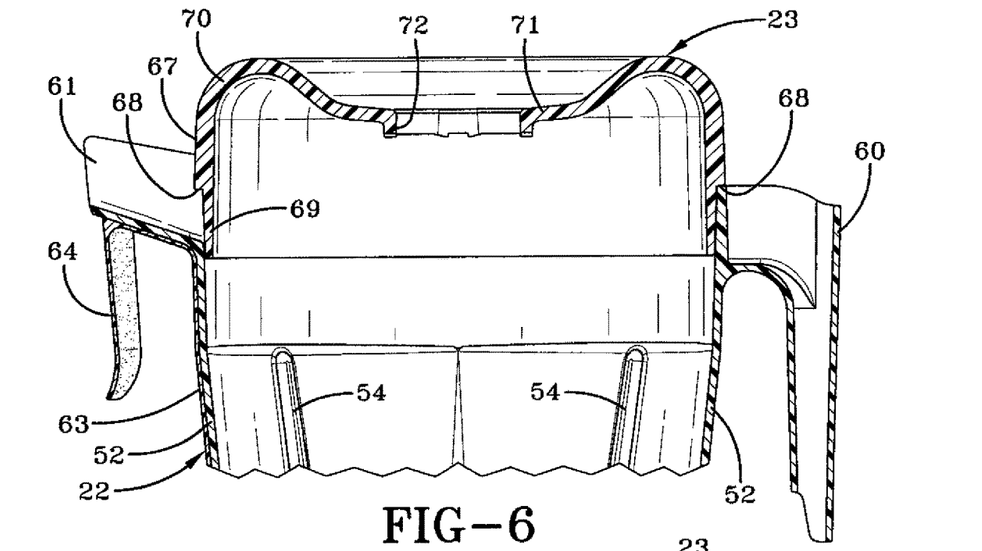
FIG. 6 is a fragmentary sectional view taken substantially along line 6-6 of FIG. 5.

Cover 23 is configured to match the configuration of the open top of container 22 and thus, in the embodiment shown, it includes a round sidewall 67 having a shoulder 68 which is adapted to rest on the rim 53 of container 22. The lower portion 69 of sidewall 67 extending below shoulder 68 is adapted to snuggly fit within the inside of container 22, and as shown in FIG. 6, at the area of spout 61, sidewall portion 69 closes spout 61. Cover 23 includes a top portion 70 extending between its sidewalls 67 which is dished out, as at 71, and provided with a central aperture 72. Aperture 72 is normally closed by a plug (not shown), but when open provides access to the inside of the container 22 should stirring or the like be desired.

Cover 23 is shown as having two diametrically opposed tab assemblies, generally indicated by the numeral 73, located at the area of shoulder 68. While two tab assemblies 73 are shown, it will be evident that the present invention would only require one tab assembly 73 or, alternatively, more than two could be provided. Each tab assembly 73 includes a body portion 74 connected to the sidewall 67 of cover 23, as by strip 75 formed adjacent to shoulder 68. A notch 76 is formed in body portion 74 below strip 75, and a handle portion 77 of tab assembly 73 extends upwardly angularly outwardly from body portion 74 at an angle of preferably about forty-five degrees. Handle portion 77 is provided with a finger hole 78 therethrough.

Figure 7:
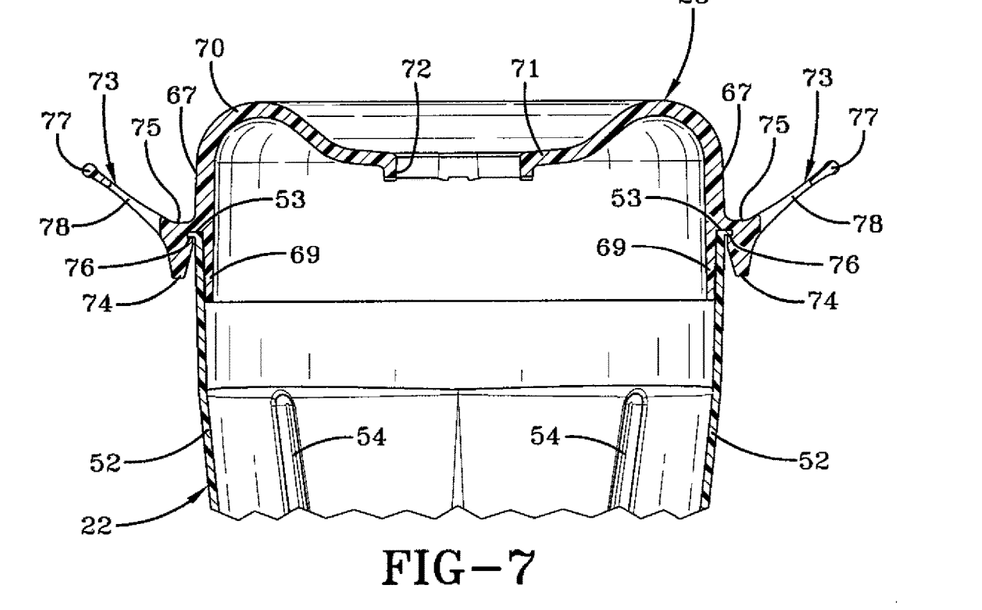
FIG. 7 is a fragmentary sectional view taken substantially along line 7-7 of FIG. 5.
Figure 8:
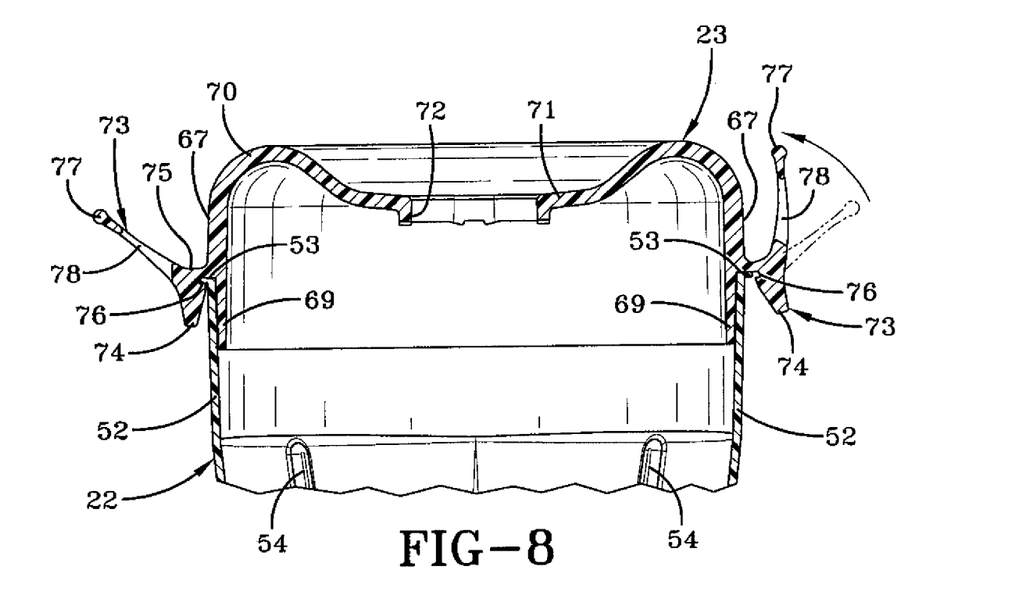
FIG. 8 is a fragmentary sectional view like FIG. 7 but showing the cover as it is being released from container.
Figure 9:
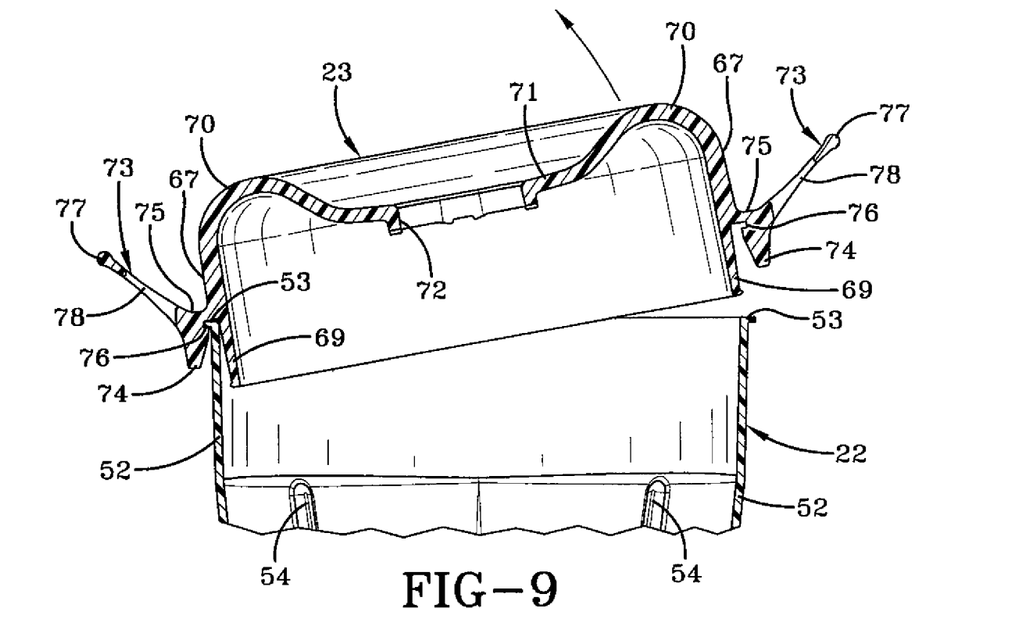
FIG. 9 is a fragmentary sectional view like FIGS. 7 and 8 and showing the cover being released from the container sequentially following FIG. 8.

Cover 23 is shown as being fully engaged by container 22 in FIG. 7. As such, container rim 53 is received in cover notch 76 and the lower portion 69 of cover sidewall 67 is engaging the inside of container sidewall 52. FIG. 8 shows the manner in which cover 23 may be released from container 22. That is, the handle portion 77 of one of the tab assemblies 73 is lifted from the chain line position to the full line position. This can be conveniently accomplished by placing one's finger in hole 78, but such is not required as long as handle 77 is being lifted. The upward movement of handle 77 only slightly flexes strip 75 until the rim 53 is released from the notch 76. This same upward movement of handle 77 also moves the cover 23 upwardly so that it may then be removed from container 22 as shown in FIG. 9. In the prior art, a handle was flexed to unlatch the cover from the container but had to be continued to be flexed to remove the cover. But in the present invention, the single slight movement accomplishes both functions.

In view of the foregoing, it should be apparent that a food processing assembly constructed as described herein accomplishes the objects of the present invention and otherwise substantially improves the art.

What is claimed is:

1. A food processing assembly comprising a container having a peripheral rim near an upper open surface, at least one mixing blade in said container and a cover for closing said upper open surface, said cover having at least one tab assembly, said tab assembly including a body portion having a notch to engage said rim and a handle portion extending upwardly from said body portion above said notch when said notch is engaging said rim, and upon upward movement of said handle portion relative to said body portion, said rim will come out of said notch to release said cover from said container.

2. A food processing assembly comprising a container having a peripheral rim near an upper open surface, at least one mixing blade in said container and a cover for closing said upper open surface, said cover having at least one tab assembly, said tab assembly including a body portion having a notch to engage said rim and a handle portion extending from said body portion, an aperture through said handle portion adapted to receive a finger of the user such that upon upward movement of said handle portion by the finger of the user in said aperture, said rim will come out of said notch to release said cover from said container.

3. The food processing assembly of claim 1 wherein said handle portion extends upwardly from said body at an angle of approximately forty-five degrees.

4. The food processing assembly of claim 1, said cover including a sidewall and said tab assembly including a strip extending from said sidewall to said body portion.

5. The food processing assembly of claim 4 wherein said notch is below said strip.

6. The food processing assembly of claim 1, said cover having a sidewall which fits within said open surface of said container, said sidewall having a shoulder adapted to rest on said rim of said container.

7. A food processing assembly comprising a container having a peripheral rim near an upper open surface, a base member for housing a motor and adapted to carry said container, air intake openings formed in said base member, a gutter formed on the outside of said base member to prevent liquid from being received by said openings, and a cover for closing said upper open surface, said cover having at least one tab assembly, said tab assembly including a body portion having a notch to engage said rim and a handle portion extending upwardly from said body portion above said notch such that upon upward movement of said handle portion, said rim will come out of said notch to release said cover from said container.

8. The food processing assembly of claim 7 wherein said gutter includes a top portion above said openings adapted to collect liquid and protect said openings from contact with the liquid.

9. The food processing assembly of claim 8 wherein said gutter includes side portions connected to said top portion and positioned at the sides of said openings, said side portions being adapted to receive liquid from said top portion.

10. The food processing assembly of claim 9 wherein said base member includes a motor housing and a platform portion, said air intake openings being formed in said motor housing and said platform portion being adapted to carry said container.

11. A food processing assembly comprising a container having a peripheral rim near an upper open surface, a base member having a platform portion including a pedestal for carrying said container, an open drainage channel formed in the top of said pedestal, and a cover for closing said upper open surface, said cover having at least one tab assembly, said tab assembly including a body portion having a notch to engage said rim and a handle portion extending from said body portion such that upon upward movement of said handle portion, said rim will come out of said notch to release said cover from said container.

12. A food processing assembly comprising a container having a base surface and at least one sidewall extending upwardly to a peripheral rim near an upper open surface, a spout formed on said sidewall, a heat shield on and extending along a surface of said sidewall generally under said spout to minimize heat from the surface of said sidewall, and a cover for closing said upper open surface, said cover having at least one tab assembly, said tab assembly including a body portion having a notch to engage said rim and a handle portion extending from said body portion such that upon upward movement of said handle portion, said rim will come out of said notch to release said cover from said container.

\* \* \* \* \*